Patented July 29, 1952

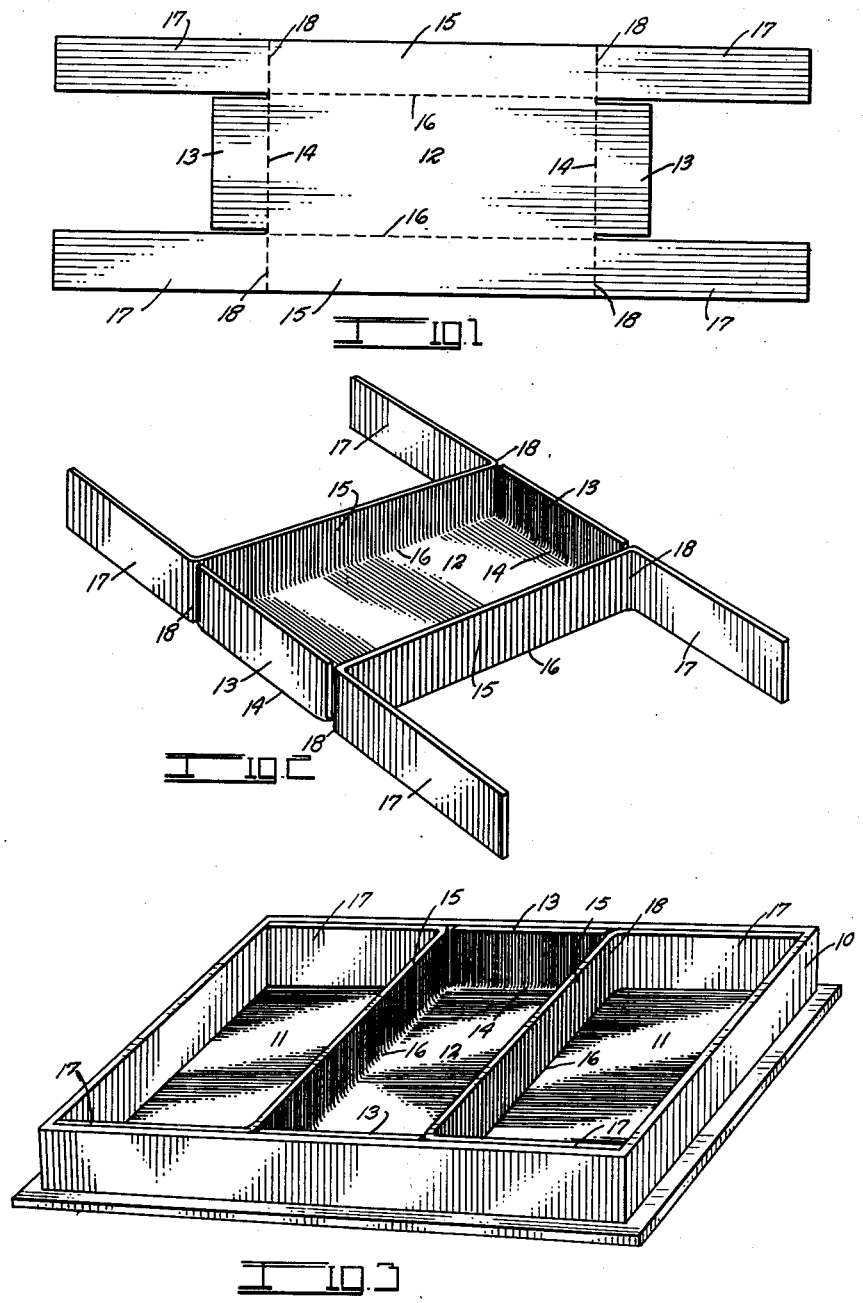

2,605,039

UNITED STATES PATENT OFFICE 2,605,039

INNER COMPARTMENT FOR CANDY BOXES

Irving A. Deline, Denver, Colo.

Application August 20, 1949, Serial No. 111,467

1 Claim. (Cl. 229—42)

This invention relates to a cardboard box, and more particularly to a box of the type used for packing candies and confections.

The principal object of the invention is to provide a simple, one-piece member which will divide a candy box into a plurality of compartments.

Another object of the invention is to provide an inner sub-box within a candy box which can be inexpensively formed and quickly erected from a single sheet of cardboard.

A further object of the invention is to provide a braced inner box within a candy box which cannot shift in any direction, so as to prevent crushing of the candy therein.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a face view of a cardboard blank cut to form the improved inner box member of a candy box;

Fig. 2 illustrates the blank form of Fig. 1 folded for insertion in a candy box; and Fig. 3 illustrates the improved inner box construction in place in a conventional candy box.

In the drawing, a conventional candy box is indicated at 10, with its bottom at 11. The improved inner box consists of a stamped blank of cardboard or similar foldable material, such as illustrated in Fig. 1.

The cardboard blank is formed to provide a sub-bottom portion 12 terminating at its extremity in relatively short side members 13 joined to the bottom 12 by means of a scored fold line 14. The sides of the sub-bottom portion 12 join two relatively long side members 15 joined to the bottom portion 12 by means of scored fold lines 16. The longer side portions 15 terminate at their extremities in elongated flaps 17 joined to the side members 15 by means of scored fold lines 18.

The side members 13 and 15 and the flaps 17 are of uniform width and of a width corresponding to the depth of the candy box 10. The side members 15 correspond in length to the length of the sub-bottom portion 12, and this length is equal to the inner width of the box 10.

The width of the sub-bottom portion 12, plus the length of two of the flaps 17, is equal to the inner length of the box 10. The length of the short side members 13 corresponds to the width of the sub-bottom 12.

In forming the device for insertion in the box 10, the four side members 13 and 15 are turned upwardly on their fold lines 14 and 16 to extend vertically on the sub-bottom portion 12. The flaps 17 are then turned at right angles to the planes of the longer side portions 15, as shown in Fig. 2. The entire folded structure is then slipped within the box 10.

It will be noted that the device divides the box 10 into three compartments, the middle compartment being an inner box formed by the sub-bottom 12 and the side members 13 and 15. It will also be noted that this inner box cannot shift in any direction, since the flaps 17 prevent movement toward the ends of the box.

It will also be noted that the side flaps 15 are rigidly supported in their vertical position by means of the support formed by the outwardly extending flaps 17. Therefore, an exceedingly rigid structure is provided which prevents endwise movement of the candy, and which allows packing of the box to display three different varieties of candy.

The flaps 17 and the short side member 13 serve as a cushioning reinforcement for the sides of the box 10. No gluing or other attachment is necessary. The entire device is held in place by frictional engagement with the side walls of the box 10, and by the weight of the contents on the sub-bottom 12.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A candy box structure comprising an outer box; an inner box equalling in length the width of the outer box; a sub-floor in said inner box; upwardly turned end members at the extremities of said sub-floor lying against the sides of said outer box; upwardly turned side members along the sides of said inner box; a flap folded outwardly from each extremity of each of said latter side members, said flaps being positioned to lie along the inside faces of the sides of said outer box and to contact the ends of the latter to prevent endwise movement of said inner box, said end members, said side members, and said flaps all being of a single thickness equal to the thickness of said sub-bottom, all of said latter members and said flaps terminating in a cut upper edge positioned in alignment with the upper edges of said outer box.

IRVING A. DELINE.

REFERENCES CITED

The following references are of record in the file of this patent:

UNITED STATES PATENTS

| Number | Name | Date |
| --- | --- | --- |
| 1,585,682 | Oppenheim | May 25, 1926 |
| 1,808,922 | Gallistel | June 9, 1931 |
| 1,987,771 | Bueschel | Jan. 15, 1935 |
| 2,314,491 | Greenberg | Mar. 23, 1943 |